United States Patent
Hayden (10) Patent No.: US 10,116,747 B2
(45) Date of Patent: Oct. 30, 2018

(54) ELECTRICITY PROVIDER CONTENT PLATFORM

(71) Applicant: Chris H. Hayden, Flower Mound, TX (US)

(72) Inventor: Chris H. Hayden, Flower Mound, TX (US)

(73) Assignee: TXU ENERGY RETAIL COMPANY LLC, Irving, TX (US)

( * ) Notice: Subject to any disclaimer, the term of this patent is extended or adjusted under 35 U.S.C. 154(b) by 991 days.

(21) Appl. No.: 13/759,387

(22) Filed: Feb. 5, 2013

(65) Prior Publication Data
US 2014/0223312 A1  Aug. 7, 2014

(51) Int. Cl.
| | |
|---|---|
| H04L 29/08 | (2006.01) |
| H04W 4/20 | (2018.01) |
| G06F 11/30 | (2006.01) |
| G06F 3/0484 | (2013.01) |

(52) U.S. Cl.
CPC ............ *H04L 67/12* (2013.01); *H04W 4/20* (2013.01); *G06F 3/04842* (2013.01); *G06F 11/3055* (2013.01)

(58) Field of Classification Search
CPC .................... G06F 3/04842; G06F 11/3055
USPC ......................................................... 715/733
See application file for complete search history.

(56) References Cited

U.S. PATENT DOCUMENTS

| | | | |
|---|---|---|---|
| 9,261,863 B2 | 2/2016 | Sloop et al. | |
| 9,471,082 B2 | 10/2016 | Sloop et al. | |
| 2004/0244390 A1* | 12/2004 | Bashark | G01R 15/142 62/160 |
| 2005/0160185 A1* | 7/2005 | Matsuura | F25D 29/00 710/1 |
| 2011/0196547 A1* | 8/2011 | Park | G06Q 50/06 700/296 |
| 2012/0310425 A1* | 12/2012 | Kang | H02J 3/14 700/286 |
| 2015/0192911 A1 | 7/2015 | Sloop et al. | |

OTHER PUBLICATIONS

U.S. Appl. No. 61/589,639, filed Jan. 23, 2012 for Christopher Dale Sloop et al.—Jan. 23, 2012.

* cited by examiner

*Primary Examiner* — Jeffrey A Gaffin
*Assistant Examiner* — John M Heffington
(74) *Attorney, Agent, or Firm* — Baker Botts L.L.P.

(57) ABSTRACT

A system for providing access to a content platform of an electricity provider comprises an interface operable to receive a request to access content from a content platform of an electricity provider from a communication device, one or more processors communicatively coupled to the interface, the one or more processors operable to determine, based on the received request, a display format for the communication device from a plurality of display formats, convert content from the content platform in the determined display format of the communication device, and the interface further operable to communicate the content to the communication device.

17 Claims, 3 Drawing Sheets

ELECTRICITY PROVIDER CONTENT PLATFORM

TECHNICAL FIELD OF THE INVENTION

This invention relates generally to providing electricity services, and specifically to an electricity provider content platform.

BACKGROUND OF THE INVENTION

Electricity providers often provide electricity customers with electronic access to information and customer accounts. Electricity customers may access electricity provider information and customer accounts using different communication devices that have different display formats. Additionally, electricity providers often provide customer services through customer accounts, for example, access to billing information.

SUMMARY OF THE INVENTION

According to embodiments of the present disclosure, disadvantages and problems associated with electricity provider content platforms may be reduced or eliminated.

A system for providing access to a content platform of an electricity provider comprises an interface operable to receive a request to access content from a content platform of an electricity provider from a communication device, one or more processors communicatively coupled to the interface, the one or more processors operable to determine, based on the received request, a display format for the communication device from a plurality of display formats, convert content from the content platform in the determined display format of the communication device, and the interface further operable to communicate the content to the communication device.

Certain embodiments of the present disclosure may include some, all, or none of the following advantages. One or more other technical advantages may be readily apparent to those skilled in the art from the figures, descriptions, and claims included herein.

In an embodiment, a system for providing access to a content platform of an electricity provider includes a single content platform that supports multiple formats of communication devices, thereby conserving the technical resources, memory, and bandwidth consumed by supporting different content platforms for each format associated with a communication device.

In an embodiment, a system for providing access to a content platform of an electricity provider includes updates to a single content platform that supports multiple formats of communication devices, thereby conserving the technical resources, memory, and bandwidth consumed by updating different content platforms for each format associated with a communication device.

In an embodiment, a system for providing access to a content platform of an electricity provider includes a content platform that enables account users to change the electricity consumption of appliances remotely from a communication device, thereby conserving electricity and reducing loads on power grids.

In an embodiment, a system for providing access to a content platform of an electricity provider includes a content platform that incentivizes electricity conservation by predicting a cost change associated with a proposed change in electricity consumption of an appliance, thereby conserving electricity and reducing loads on power grids.

In an embodiment, a system for providing access to a content platform of an electricity provider includes a content platform that incentivizes electricity conservation by facilitating advertising of cost savings associated with reducing electricity usage to users of social networks, thereby conserving electricity and reducing loads on power grids.

In an embodiment, a system for providing access to a content platform of an electricity provider includes a content platform that allows users to access the same information across a number of communication device formats, thereby providing consistent information independent of accessing communication device format.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
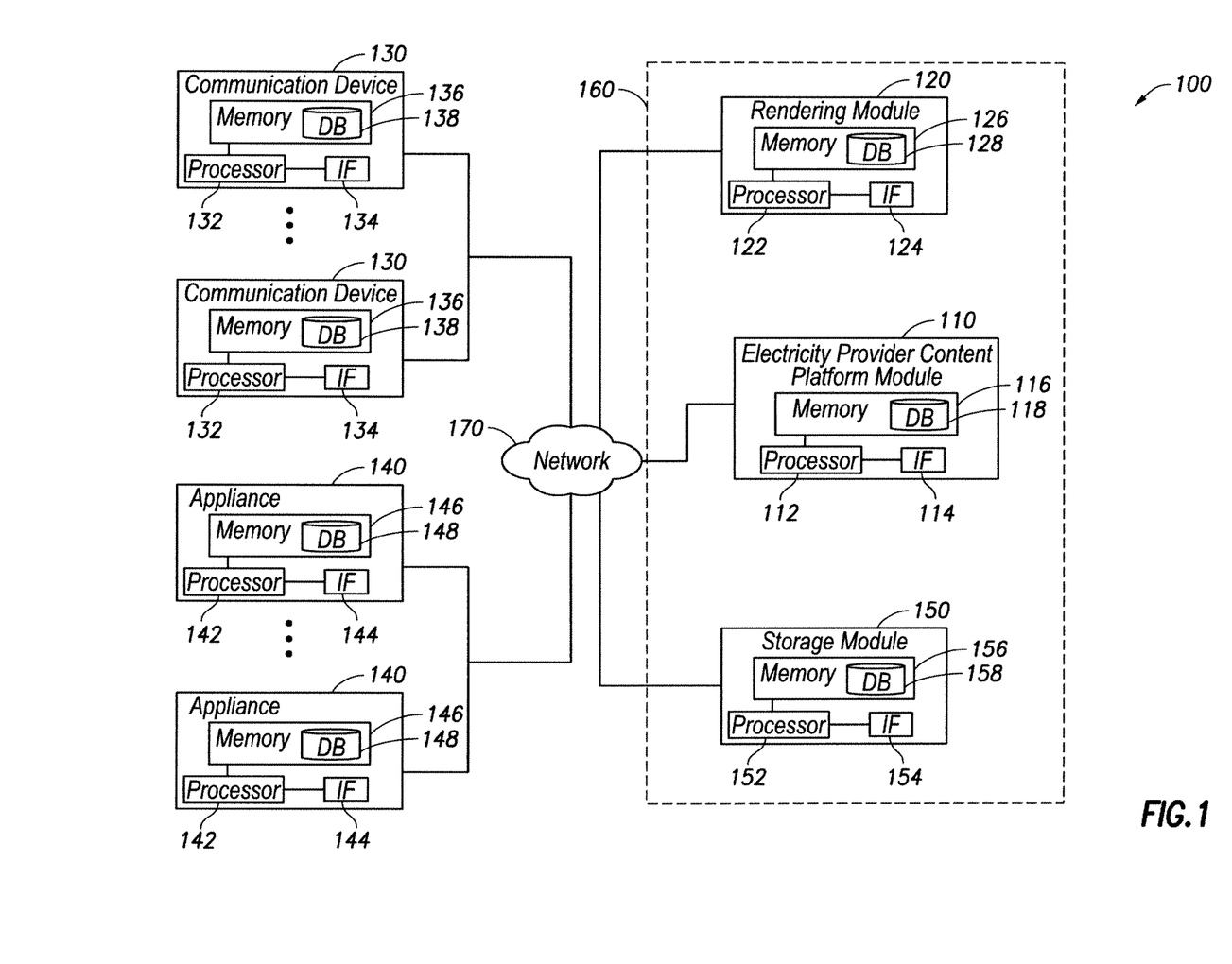
FIG. 1 is a block diagram of an example embodiment of a system implementing a content platform for an electricity provider.
Figure 2:
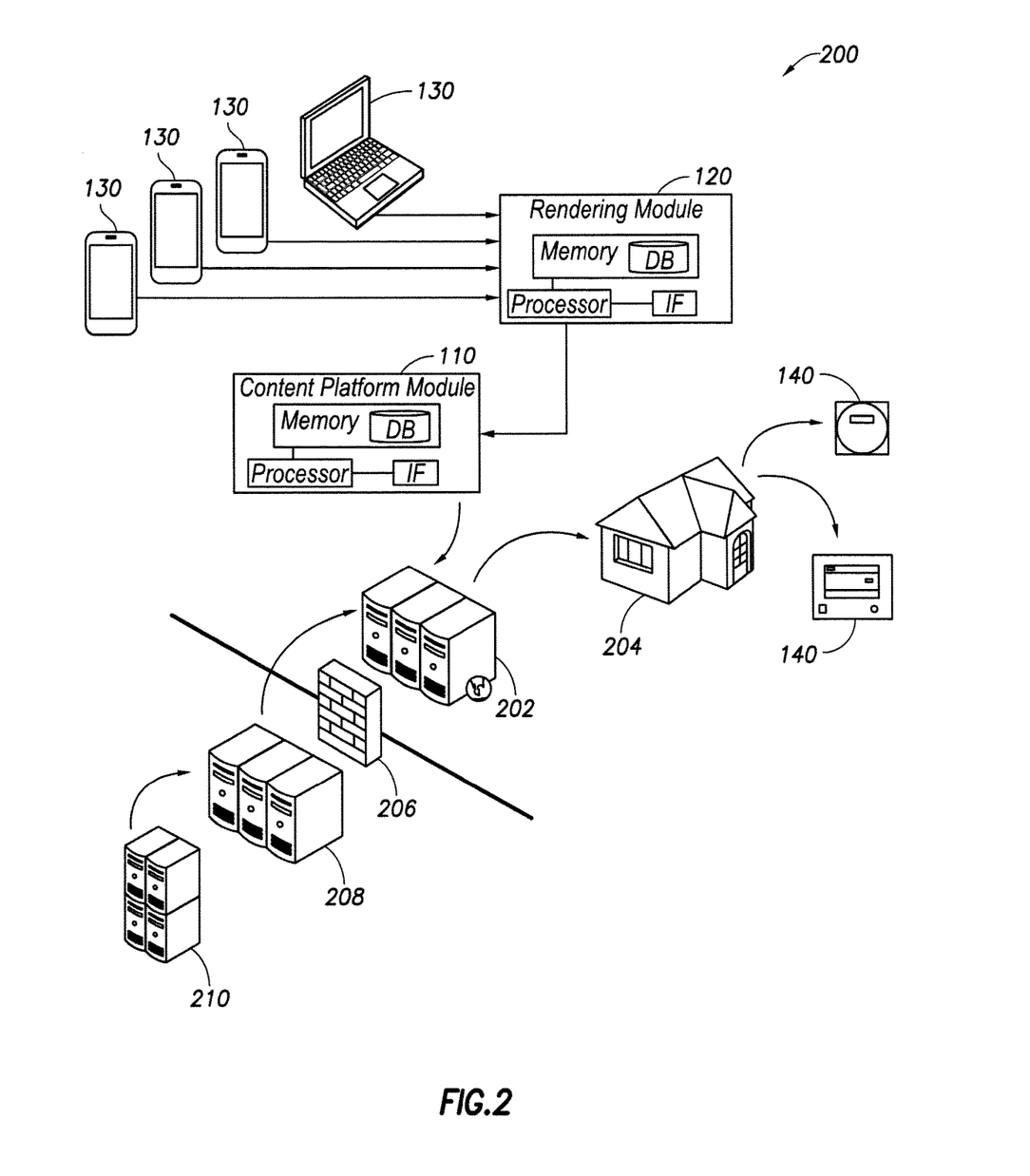
FIG. 2 is a block diagram of an example embodiment of a system implementing a content platform for an electricity provider.
Figure 3:
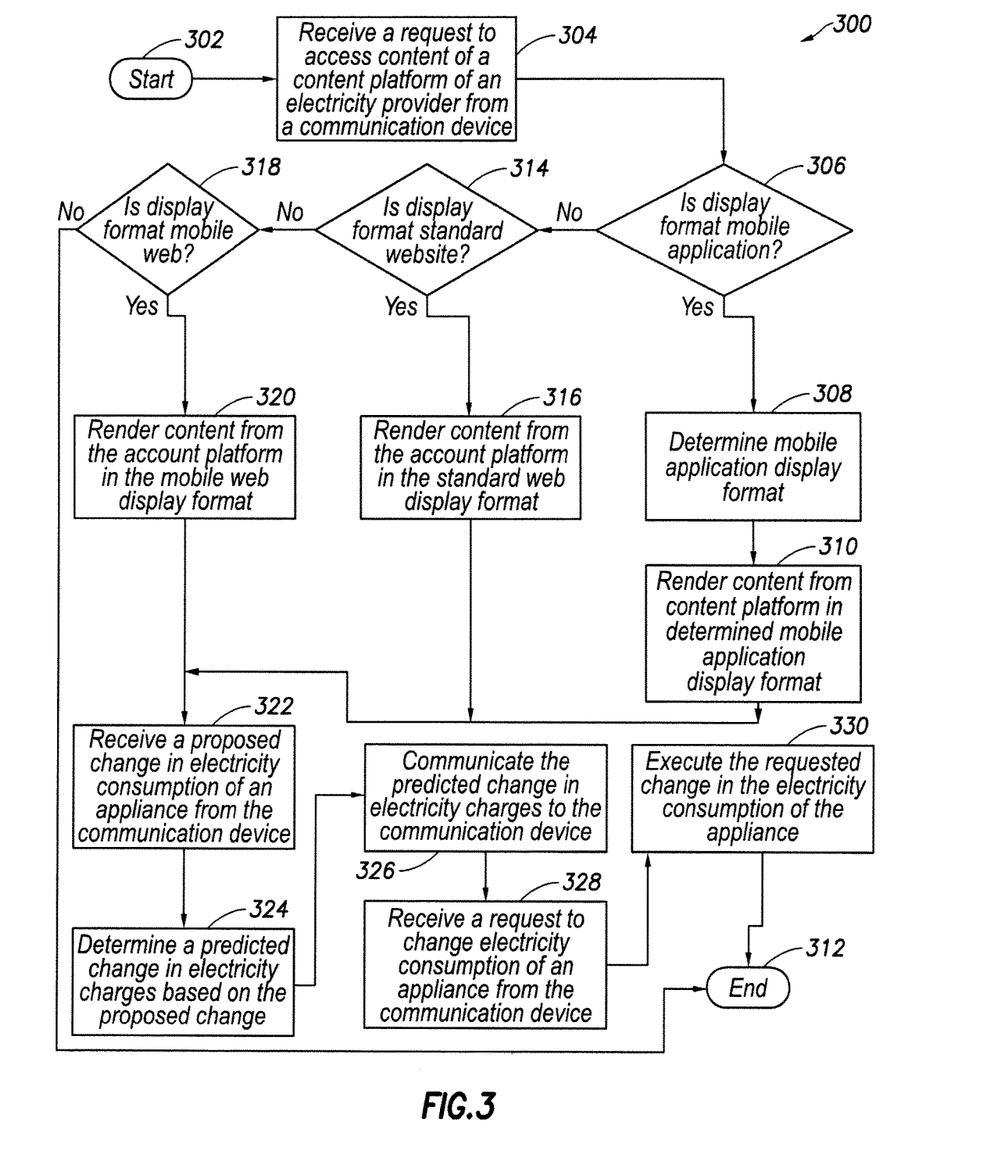
FIG. 3 is a flow chart of an example embodiment of a method for providing a content platform for an electricity provider.

Embodiments of the present invention and its advantages are best understood by referring to FIGS. 1 through 3 of the drawings, like numerals being used for like and corresponding parts of the various drawings.

In an example, a system for providing a content platform for an electricity provider comprises an electricity provider content platform module, a rendering module, one or more communication devices, one or more appliances that consume electricity from a power grid (as opposed to a battery), a storage module, an enterprise, and a network. Content platform module represents a component operable to provide access to electricity customer accounts and provide electricity customer account services (e.g., account billing, regulation of electricity consumption of networked appliances associated with an electricity customer account, billing information, or other electricity service provider services). In certain embodiments, electricity provider content platform module represents a centralized provisioning point for content from an electricity provider website, mobile website, and applications (e.g., mobile applications).

Rendering module represents a component operable to identify the display format of communication devices based on requests from communication devices (e.g., smartphones, tablets, laptops, desktops, or any other suitable electronic communication device) to access content from the content platform module and to convert the content of the content platform module to the identified format of the requesting communication devices. For example, an electricity customer may login to their electricity customer account using a communication device through a standard website, a mobile website, a mobile application, or other suitable interface. Rendering module allows for a single content platform module to service a plurality of different communication devices with a plurality of different display formats (e.g., standard websites, mobile websites, mobile applications such as Apple iOS™, Android™, Blackberry OS™, Windows Phone™, or other mobile application operating system format, or other display format), thereby eliminating the need to develop content platform modules corresponding to every supported display format.

Content platform module provides electricity customer account services to electricity customers. In an embodiment, content platform module is operable to receive from a communication device associated with an electricity customer account (e.g., because the customer has logged in to their account through the communication device) a proposed change in the electricity consumption of an appliance associated with the electricity customer account (e.g., an appliance at a premises associated with the same electricity customer account as the communication device). Content platform module may calculate an actual or estimated billing change associated with the proposed change in electricity consumption. In an embodiment, content platform module receives a request from a communication device associated with an electricity customer account to execute a change in electricity consumption of an appliance at a premises associated with the electricity customer account. For example, appliances (e.g., water heaters, pool pumps, thermostats, outlets, lights, smart meters, or other appliances consuming electricity from a power grid) may have controls connected to a network such that the electricity consumption of the appliances (e.g., temperature control, on/off control, dimmer control, or other control that affects the electricity consumption of an appliance) can be controlled over the network.

In an example, content platform module is operable to determine billing changes in an account (e.g., change in billing plan, change in electricity consumption, change in projected charges, change in actual charges, or any other suitable billing change in an account). Content platform module may generate a push message to a communication device (e.g., text message or notification message) or communication platform (e.g., e-mail or social media account) containing content associated with the change in billing. For example, an electricity customer may change their billing plan and content platform module may calculate an actual or projected billing change resulting from the change in billing plan. Content platform module may communicate a push message to an electricity customer allowing the electricity customer to post content from the push message to a social media network describing the billing change (e.g., a message describing the cost savings the electricity customer realized from the billing change).

FIG. 1 is a block diagram of an example embodiment of a system 100 implementing content platform 110 for an electricity provider. According to an embodiment, system 100 includes electricity provider content platform module 110, rendering module 120, communication devices 130, appliances 140, storage module 150, enterprise 160, and network 170. Components of system 100, for example content platform 110, rendering module 120, communication devices 130, appliances 140, storage module 150, and enterprise 160, may be communicatively coupled by network 170. In certain embodiments, any component of system 100 can communicate with one or more other components of system 100.

Electricity provider content platform module 110 represents a component of system 100 that provides electronic access to content provided by an electricity provider through a website, mobile website, or mobile applications (e.g., Apple iOS™, Android™, Blackberry OS™, Windows Phone™, or other mobile application operating system). Content may include information and services (e.g., electricity customer account services) provided by the electricity provider through a website, mobile website, or mobile applications. In an embodiment, content platform module 110 represents a centralized provisioning point for electronic access to content from an electricity provider's website, mobile website, and mobile applications and the content provided by the website, mobile website, and mobile applications is provisioned by content platform module 110. Provisioning content from a single content platform module 110 for an electricity provider's website, mobile website, and mobile applications provides content uniformity and reduces the time and resources required to make updates because updates can be made at a single component. Content platform module 110 may include one or more of processor 112, interface 114, memory 116, and database 118.

Content platform module 110 may be operable to receive a proposed change in the electricity consumption of appliance 140 (e.g., appliance 140 represents a device at a premises associated with the same electricity customer account that communication device 130 accesses) from a communication device 130 (e.g., the customer has logged in to the account through communication device 130). In an embodiment, content platform module 110 determines an actual or estimated billing change associated with the proposed change in electricity consumption of appliance 140 received from communication device 130.

Content platform module 110 may be operable to execute changes in electricity consumption of appliances 140 in response to requests from communication devices 130. For example, appliances 140 (e.g., water heaters, pool pumps, thermostats, outlets, lights, smart meters, or other appliances consuming electricity from an electricity grid) may have controls connected to network 170 such that the electricity consumption of appliance 140 (e.g., temperature control, on/off control, scheduling control, dimmer control, or other control that affects the electricity consumption of an appliance) can be controlled over network 170. Content platform module 110 may receive a request to change the electricity consumption of appliance 140 at a premises from a communication device 130 associated with the premises (e.g., both the communication device 130 and the premises are associated with the same customer account). In an embodiment, content platform module 110 communicates with appliance 140 over network 170 and executes the requested change in electricity consumption for appliance 140.

In an embodiment, content platform module 110 is operable to determine billing changes in an account (e.g., change in billing plan, change in electricity consumption, change in projected charges, change in actual charges, or any other suitable billing change in an account). Content platform module may generate a push message to communication device 130 (e.g., text message or notification message) or other communication interface associated with the account (e.g., e-mail or social media profile) containing content associated with the change in billing. Push messages represent messages transmitted by content platform module 110 to customers (e.g., communication devices, social media profiles, e-mail addresses, or other suitable customer interface) without customers having to request them. Push messages may utilize Push Access Protocol (PAP) or other suitable communication protocol. An electricity customer may change their billing plan and content platform module 110 may calculate an actual or projected billing change resulting from the change in billing plan. In an embodiment, content platform module 110 communicates a push message to the electricity customer requesting enabling the electricity customer to post content from the push message to a social media network describing the billing change (e.g., a message describing the cost savings the electricity customer realized from the billing change).

Rendering module 120 represents a component of system 100 operable to identify the display format of communication devices 130 based on requests from communication devices 130 (e.g., smartphones, tablets, laptops, desktops, or any other suitable electronic communication device) to access content from the content platform module 110 and format the content of content platform module 110 to the identified format of the requesting communication devices 130. For example, an electricity customer requests content from content platform module 110 using communication device 120 through a standard website, a mobile website, a mobile application, or other suitable interface, and rendering module 120 may convert the requested content to the identified display format of requesting communication device 130. Rendering module 120 may include one or more of processor 122, interface 124, memory 126, and database 128.

Rendering module 120 allows for a single content platform module 110 to service a plurality of different communication devices 130 with a plurality of different display formats (e.g., standard websites, mobile websites, mobile applications such as Apple iOS™, Android™, Blackberry OS™, Windows Phone™, or other mobile application operating system format, or other display format), thereby eliminating the need to develop content platform modules 110 corresponding to every supported display format. Rendering module 120 may be operable to determine the display format of the requesting communication device 130, for example, from information received from the application program interface (API) of the mobile application, detecting the browser type, and/or detecting the display resolution. In an embodiment, rendering module 120 relays communications from communication devices 130 to content platform module 110. Rendering module 120 may receive content from content platform module 110 to be communicated to requesting communication device 130, convert the requested content into the display format of the requesting communication device 130, and communicate the content to communication device 130.

Communication devices 130 represent components of system 100 that facilitate electricity customers, or prospective electricity customers, accessing electronic content of content platform module 110. Communication devices 130 include smart phones, tablets, laptop computers, desktop computers, or any other suitable communication device operable to access an electronic communication network (e.g., the internet). Communication devices 130 may be operable to access standard web pages, mobile web pages, and/or execute applications (e.g., mobile applications). In an embodiment, communication devices 130 are operable to control the electricity consumption of appliances 140. For example, manufacturers of appliance 140 and/or an electricity provider may provide applications that can be installed on communication devices 130 to enable communication devices 130 to communicate with networked controls of appliances 140 (e.g., a networked control for a water heater, pool pump, thermostat, outlet, light, smart meter, or other appliance 140 consuming electricity from an electricity grid). Communication devices 130 may include one or more of processor 132, interface 134, memory 136, and database 138.

Appliances 140 represent components of system 100 that consume electricity from an electricity grid (e.g., non-battery powered). Appliances 140 may be at a location associated with an electricity customer, for example, a residence, business, or other building or property. Appliances 140 include water heaters, pool pumps, thermostats, outlets, lights, smart meters, or other apparatuses consuming electricity from an electricity grid. In an embodiment, appliances 140 include networked controls that enable communication devices 130 to communicate over network 170 with the networked controls to control the electricity consumption of appliances 140. For example, networked controls may be operable to adjust the temperature, operation schedule, on/off status, intensity, or other aspect of the operation of appliances 140 that impact the electricity consumption of appliances 140. In certain embodiments, appliances 140 may utilize appliance infrastructure (e.g., network components) to enable appliances 140 to communicate with network 170. Appliances 140 may include one or more of processor 142, interface 144, memory 146, and database 148.

Storage module 150 represents a component of system 100 that stores information for components of system 100 (e.g., content platform module 110 and rendering module 120). Storage module 150 may store content for websites, mobile websites, applications (e.g., mobile applications), billing information, customer account information, product information, service information, contact information, or any other information relied upon by system 100. In certain embodiments, storage module 150 comprises one or more servers. Storage module 150 may include one or more of processor 152, interface 154, memory 156, and database 158.

Enterprise 160 represents an entity that manages all or a portion of system 100. In an embodiment, enterprise 160 includes electricity provider content platform module 110, rendering module 120, and storage module 150. Enterprise 160 may also include appliances 140 and supporting infrastructure, for example, networking components connecting appliances 140 to network 170. In certain embodiments, enterprise 160 refers to an electricity service provider, however, enterprise 160 may also include other entities such as network service providers (e.g., entities providing network connections between appliances 140 and network 170) and account management service providers (e.g., entities providing infrastructure and support for managing electricity customer accounts). Enterprise 160 may have different units or subdivisions that handle different activities of enterprise 160.

Network 170 represents any suitable network operable to facilitate communication between components of system 100, such as electricity provider content platform module 110, rendering module 120, communication devices 130, appliances 140, storage module 150, and enterprise 160. Network 170 may include any interconnecting system capable of transmitting audio, video, electrical signals, optical signals, data, messages, or any combination of the preceding. Network 170 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

A module (e.g., electricity provider content platform module 110, rendering module 120, and storage module 150) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as electricity provider content platform module 110, rendering module 120, communication devices 130, appliances 140, and storage module 150, may include one or more processors. A processor represents any computing device, such as processors 112, 122, 132, 142, and 152, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., electricity provider content platform module 110, rendering module 120, and storage module 150), an interface (e.g., interfaces 114, 124, 134, 144, and 154), a memory (e.g., memories 116, 126, 136, 146, and 156), a database (e.g., databases 118, 128, 138, 148, and 158), or any other suitable component.

An interface represents any device, such as interfaces 114, 124, 134, 144, and 154, operable to receive input, send output, process the input or output, or perform other suitable operations for a component of system 100. An interface includes any port or connection, real or virtual, including any suitable hardware or software, including protocol conversion and data processing capabilities, to communicate through network 170. In certain embodiments, an interface includes a user interface (e.g., physical input, graphical user interface, touchscreen, buttons, switches, transducer, or any other suitable method to receive input from a user).

A memory represents any device, such as memories 116, 126, 136, 146, and 156, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of a component of system 100. A memory may further include some or all of one or more databases (e.g., databases 118, 128, 138, 148, and 158).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

Modifications, additions, or omissions may be made to system 100. System 100 may include more, fewer, or other components. Any suitable component of system 100 may include a processor, interface, logic, memory, or other suitable element.

FIG. 2 is a block diagram of an example embodiment of a system 200 implementing content platform 110 for an electricity provider. System 200 includes content platform module 110, rendering module 120, communication devices 130, appliances 140, web servers 202, customer premises 204, firewall 206, communication severs 208, and customer account information servers 210. Content platform module 110, rendering module 120, communication devices 130, and appliances 140 are described above with respect to FIG. 1.

Web servers 202 represent internet servers operable to facilitate communication between components of system 200. For example, web servers 202 may support communication among content platform module 110, rendering module 120, communication devices 130, appliances 140, communication severs 208, customer account information servers 210, or any other suitable component of system 200. In an embodiment, web servers 202 are a component of network 170.

Customer premises 204 represent a premises (e.g., one or more buildings, structures, or properties) associated with one or more electricity provider customer accounts. Premises 204 may contain a plurality of appliances 140 that consume electricity from an electricity grid associated with an electricity provider (e.g., enterprise 160). Premises 204 may be a residence, business, or other building or property.

Firewall 206 represents a component of system 200 that provides network security for communication servers 208 and customer account information servers 210. In an embodiment, communication servers 208 and customer account information servers 210 may be part of a LAN separated from a WAN (e.g., the internet) by firewall 206. Firewall 206 may be software and/or hardware based. In an embodiment, firewall 206 regulates the flow of communication packets between web servers 202 and communication servers 208 to verify that only authorized packets reach communication servers 208.

Communication servers 208 represent servers that facilitate communication between customer account information servers 210 and web servers 202 or any other suitable component of system 200. In an embodiment, communication severs 210 are a component of network 170. Customer account information servers 210 represent servers that store electricity service provider customer account and billing information. In an embodiment, content platform module 110 provisions content stored in customer account information servers 210 to communication devices 130 in response to requests for content from communication devices 130. In certain embodiments, customer account information servers 210 are part of storage module 150.

In an embodiment of operation of system 200, content platform module 110 receives content requests from communication devices 130. Rendering module 120 identifies the display format of the requesting communication devices 130 and converts content from content platform module 110 to the identified display format of requesting communication device 130. Content platform module 110 provisions requested content from content platform module 110 and/or other components of system 200 (e.g., appliances 140, storage module 170, and customer account information servers 210) to communication devices 130.

In an example, account platform module 110 receives a message comprising a proposed increase in temperature of thermostat 140 at customer premises 204 from communication device 130. Rendering module 120 determines that the display format of communication device 130 is Apple iOS™. Content platform module 110 communicates with customer account information servers 210 through communication servers 208, firewall 206, and web servers 202 to access the account information of the customer associated with communication device 130. Content platform module 110 may access the account information of customer associated with communication device 130 to determine the customer's billing plan and account records. Content platform module 110 calculates an actual or estimated cost savings from the proposed increase in temperature of thermostat 140, for example, based on historical billing records for the account, historical temperature settings and/or readings from thermostat 140, weather forecasts, or any other suitable bill modeling information. Content platform module 110 communicates a message with the estimated or actual cost savings to communication device 130. Rendering module 120 converts the content of the message from content platform module 110 into Apple iOS™ display format and relays the message to communication device 130.

Account platform module 110 may receive a request to execute the proposed increase in temperature of thermostat 140 at customer premises 204 from communication device 130 (e.g., in response to the estimated or actual cost savings determined by content platform module 110). Content platform module 110 communicates with thermostat 140 at customer premises 204 through web servers 202 to execute the temperature change. Content module 110 may generate a push message to communication device 130 (e.g., text message or notification message) or communication platform (e.g., e-mail or social media profile) containing content associated with the change in billing. For example, content module 110 may communicate a push message to communication device 130 including content that the customer can post to a social media network describing the billing change (e.g., a message describing the cost savings the electricity customer realized from the reduction in temperature of thermostat 140). Rendering module 120 converts the push message into Apple iOS™ format and relays it to communication device 130.

Modifications, additions, or omissions may be made to system 200. System 200 may include more, fewer, or other components. Components of system 200 may be included within network 170 and/or storage module 150. Any suitable component of system 200 may include a processor, interface, logic, memory, or other suitable element. Push messages may contain any suitable content (e.g., notifications, advertisements, or other content).

FIG. 3 is a flow chart of an example embodiment of a method 300 for providing a content platform for an electricity provider. Method 300 starts at step 302. At step 304, content platform module 110 receives a request to access content from a communication device 130. At step 306, rendering module 120 determines whether the display format of communication device 130 is a mobile application.

If rendering module 120 determines that the display format of communication device 130 is a mobile application, method 300 moves to step 308 and rendering module determines the mobile application display format and rendering module 120 converts the requested content into the determined format at step 310. Mobile application display formats may include Apple iOS™, Android™, Windows Phone™, BlackBerry OS™, or any other suitable mobile application display format. If rendering module 120 determines that the display format of communication device 130 is not a mobile application, the method proceeds to step 314 and rendering module 120 determines whether the display format of communication device 130 is a standard website. If rendering module 120 determines that the display format of communication device 130 is a standard website, the method proceeds to step 316 and rendering module 120 renders the requested content from content platform module 110 in standard website display format.

If rendering module 120 determines that the display format of communication device 130 is not a standard website display format, the method proceeds to step 318 and rendering module 120 determines whether the display format of communication device 130 is a mobile website. If rendering module 120 determines that the display format of communication device is mobile website display format, the method proceeds to step 320 and rendering module 120 renders the requested content from content platform module 110 in mobile website display format. If rendering module 120 determines that the display format of communication device 130 is not a mobile website, the method proceeds to step 312 and the method ends. In certain embodiments, system 100 supports additional display formats and method 300 includes determination steps of whether the display format of communication device 130 is one of the additional display formats.

After the requested content is converted to the appropriate display format, the method proceeds to step 322 and content platform module 110 determines whether a proposed change in the electricity consumption of appliance 140 associated with communication device 130 (e.g., appliance 140 and communication device 130 are associated with the same electricity customer account) has been received from communication device 130. If content platform module 110 determines that a proposed change in the electricity consumption of appliance 140 has not been received, the method proceeds to step 312 and the method ends. If content platform module 110 determines that a proposed change in the electricity consumption of appliance 140 has been received, the method proceeds to step 324. At step 324, content platform module 110 determines a predicted change in electricity charges of an electricity account associated with communication device 130 based on the received proposed change in the electricity consumption of appliance 140. At step 326, content platform module 110 communicates the predicted change in electricity charges to communication device 130 in response to the proposed change in electricity consumption of appliance 140.

At step 328, content platform module 110 receives a request from communication device 130 to change the electricity consumption of appliance 140 associated with communication device 130. At step 330, content platform module 110 executes the requested change in electricity consumption of appliance 140. At step 312, method 300 ends.

Modifications, additions, or omissions may be made to method 300. The method may include more, fewer, or other steps. Additionally, steps may be performed in any suitable order. Any suitable component of system 100 may perform one or more steps of method 300.

Certain embodiments of the present disclosure may include some, all, or none of the following advantages. One or more other technical advantages may be readily apparent to those skilled in the art from the figures, descriptions, and claims included herein.

In an embodiment, a system for providing access to a content platform of an electricity provider includes a single content platform that supports multiple formats of communication devices, thereby conserving the technical resources, memory, and bandwidth consumed by supporting different content platforms for each format associated with a communication device.

In an embodiment, a system for providing access to a content platform of an electricity provider includes updates to a single content platform that supports multiple formats of communication devices, thereby conserving the technical resources, memory, and bandwidth consumed by updating different content platforms for each format associated with a communication device.

In an embodiment, a system for providing access to a content platform of an electricity provider includes a content platform that enables account users to change the electricity consumption of appliances remotely from a communication device, thereby conserving electricity and reducing loads on power grids.

In an embodiment, a system for providing access to a content platform of an electricity provider includes a content platform that incentivizes electricity conservation by predicting a cost change associated with a proposed change in electricity consumption of an appliance, thereby conserving electricity and reducing loads on power grids.

In an embodiment, a system for providing access to a content platform of an electricity provider includes a content platform that incentivizes electricity conservation by facilitating advertising of cost savings associated with reducing electricity usage to users of social networks, thereby conserving electricity and reducing loads on power grids.

In an embodiment, a system for providing access to a content platform of an electricity provider includes a content platform that allows users to access the same information across a number of communication device formats, thereby providing consistent information independent of accessing communication device format.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for providing access to a content platform of an electricity provider, comprising:
an interface operable to:
receive a request to access content of a content platform of an electricity provider from a communication device;
receive a proposed change in electricity consumption of an appliance from the communication device;
one or more processors communicatively coupled to the interface, the one or more processors operable to:
determine, based on the received request, a display format for the communication device from a plurality of display formats;
convert content from the content platform in the determined display format of the communication device;
determine a predicted change in electricity charges based on the proposed change; and
the interface further operable to:
communicate the content in the determined display format to the communication device; and
communicate the predicted change in electricity charges to the communication device.

2. The system of claim 1, the interface further operable to receive a request to change the electricity consumption of the appliance from the communication device; and
the one or more processors further operable to execute the requested change in the electricity consumption of the appliance.

3. The system of claim 2, wherein the appliance is one from the set comprising: a smart electric meter, a thermostat, a water heater, a smart plug, and a pool pump.

4. The system of claim 1, wherein the plurality of display formats includes one or more from the set comprising: an Android™ compatible format, an iOS™ compatible format, a Windows Phone™ compatible format, a BlackBerry OS™ compatible format, a mobile web compatible format, and a standard web compatible format.

5. The system of claim 1, the one or more processors further operable to:
determine that a billing change has occurred on an account serviced by the content platform that is associated with the communication device;
generate a push message comprising an option to post a description of the billing change on a social network; and
the interface further operable to communicate the push message to the communication devices.

6. The system of claim 1, wherein the remote device is from the set comprising: a smartphone, a tablet, laptop computer, and desktop computer.

7. A computer-readable medium comprising logic for providing access to a content platform of an electricity provider, the logic, when executed by a processor, operable to:
receive a request to access content of a content platform of an electricity provider from a communication device;
receive a proposed change in electricity consumption of an appliance from the communication device;
determine, based on the received request, a display format for the communication device from a plurality of display formats;
convert content from the content platform in the determined display format of the communication device;
determine a predicted change in electricity charges based on the proposed change;
communicate the content in the determined display format to the communication device; and
communicate the predicted change in electricity charges to the communication device.

8. The computer-readable medium of claim 7, the logic further operable to:
receive a request to change the electricity consumption of the appliance from the communication device; and
execute the requested change in the electricity consumption of the appliance.

9. The computer-readable medium of claim 8, wherein the appliance is one from the set comprising: a smart electric meter, a thermostat, a water heater, a smart plug, and a pool pump.

10. The computer-readable medium of claim 7, wherein the plurality of display formats includes one or more from the set comprising: an Android™ compatible format, an iOS™ compatible format, a Windows Phone™ compatible format, a BlackBerry OS™ compatible format, a mobile web compatible format, and a standard web compatible format.

11. The computer-readable medium of claim 7, the logic further operable to:
determine that a billing change has occurred on an account serviced by the content platform that is associated with the communication device;

generate a push message comprising an option to post a description of the billing change on a social network; and communicate the push message to the communication devices.

12. A method for providing access to a content platform of an electricity provider, comprising:

receiving a request to access content of a content platform of an electricity provider from a communication device;

determining, by one or more processors, based on the received request, a display format for the communication device from a plurality of display formats;

receiving a proposed change in electricity consumption of an appliance from the communication device;

determining, by the one or more processors, a predicted change in electricity charges based on the proposed change;

rendering, by the one or more processors, content from the content platform in the determined display format of the communication device; and communicating the predicted change in electricity charges to the communication device, wherein the predicted change is communicated to the communication device in the determined display format of the communication device.

13. The method of claim 12, further comprising:
receiving a request to change the electricity consumption of the appliance from the communication device; and
executing, by the one or more processors, the requested change in the electricity consumption of the appliance.

14. The method of claim 13, wherein the appliance is one from the set comprising: a smart electric meter, a thermostat, water heater, a smart plug, and a pool pump.

15. The method of claim 12, wherein the plurality of display formats includes one or more from the set comprising: an Android™ compatible format, an iOS™ compatible format, a Windows Phone™ compatible format, a BlackBerry OS™ compatible format, a mobile web compatible format, and a standard web compatible format.

16. The method of claim 12, further comprising:
determining, by the one or more processors, that a billing change has occurred on an account serviced by the content platform that is associated with the communication device;
generating, by the one or more processors, a push message comprising an option to post a description of the billing change on a social network; and
communicating the push message to the communication devices.

17. The method of claim 12, wherein the remote device is from the set comprising: a smartphone, a tablet, laptop computer, and desktop computer.

* * * * *